United States Patent [19]
Jacobs et al.

[11] Patent Number: 5,251,828
[45] Date of Patent: Oct. 12, 1993

[54] PROCESS AND APPARATUS FOR RECLAIMING CO-EXTRUDED CAR TRIM

[75] Inventors: James R. Jacobs, Thomaston; Michael R. Twomey, Newnan, both of Ga.

[73] Assignee: Mindis Metals, Inc., Atlanta, Ga.

[21] Appl. No.: 967,455

[22] Filed: Oct. 28, 1992

[51] Int. Cl.$^5$ .................................................. B02C 7/00
[52] U.S. Cl. ........................................ 241/24; 209/173; 241/79.1; 241/DIG. 38
[58] Field of Search .......... 241/20, 24, 79.1, DIG. 38; 209/3, 10, 17, 173; 264/37, DIG. 69; 521/46.5

[56] References Cited

U.S. PATENT DOCUMENTS

| | | | |
|---|---|---|---|
| 3,735,931 | 5/1973 | Weston | 241/24 |
| 4,073,661 | 2/1978 | Buzga et al. | 134/1 |
| 4,199,109 | 4/1980 | Watanabe | 241/24 |
| 4,276,155 | 6/1981 | Roeschlaub et al. | 209/10 |
| 4,379,525 | 4/1983 | Nowicki et al. | 241/20 |
| 4,543,364 | 9/1985 | Nankee et al. | 521/40 |
| 4,728,045 | 3/1988 | Tomaszek | 241/19 |
| 4,809,854 | 3/1989 | Tomaszek | 209/3 |
| 5,022,985 | 6/1991 | Nugent | 241/DIG. 38 |
| 5,069,571 | 3/1992 | Womack et al. | 241/24 |
| 5,148,993 | 9/1992 | Kashiwagi | 241/DIG. 38 |

Primary Examiner—Douglas D. Watts
Attorney, Agent, or Firm—Needle & Rosenberg

[57] ABSTRACT

A process and apparatus for receiving and reducing co-extruded car trim into chips and for separating the components of the chips into a metal fraction and a plastic fraction is provided; the chips are immersed in a heated liquid medium which subsequently separates the plastic from the metal with agitation and heat. The plastic and the metal are finally classified by their respective densities in a liquid upflow column.

25 Claims, 3 Drawing Sheets

PROCESS AND APPARATUS FOR RECLAIMING CO-EXTRUDED CAR TRIM

BACKGROUND OF THE INVENTION

This invention relates in general to a co-extruded car trim (CECT) reclaiming process and apparatus, and in particular to apparatus for automatically classifying and separately collecting the constituent components of CECT.

An estimated 6.5 million pounds per year of waste co-extruded car trim is produced in the manufacture of car trim. A typical piece of CECT contains a strip of metal which has been extruded with a plastic coating. CECT is primarily stainless steel and PVC, although it may comprise other metals and plastics. Both of these materials are commercially valuable when separated from each other. Discarded CECT provides a particularly significant source of metal and plastics.

Currently known methods for processing co-extruded car trim are inefficient and expensive. For example, cryogrinding the trim in liquid nitrogen can successfully separate the metal component from the plastic component in a continuous process, but is prohibitively expensive due to the cost of liquid nitrogen.

Thus, there is a need for a relatively economical and effective way to process discarded CECT so as to reclaim valuable materials which make up CECT.

SUMMARY OF THE INVENTION

Stated in general terms, the present process and apparatus provide the continuous separation of CECT into its constituents for reclaiming and classifying the metals and plastics. These separated materials are deposited into suitable containers for further processing.

Stated somewhat more specifically, the CECT reclaiming process and apparatus of the present invention includes a size reduction machine (SRM) which creates CECT chips of uniform size. The CECT chips come out of the SRM onto a conveying means which feeds a magnetic drum separator (MDS). At this stage the non-magnetic chips are removed from the system and are deposited into a suitable container for further processing. The magnetic material is transported from the MDS to the thermal-mechanical separating classifier (TMSC). The magnetic material is submerged in a heated liquid medium which is mechanically agitated to produce a scrubbing action of chip against chip and chip against agitator. This scrubbing action, in combination with heat, releases the plastic from the metal. The plastic material, which is less dense than the metal fraction, is carried upward in a liquid upflow column which overflows out of the TMSC. The metal material, which is more dense than the plastic, sinks through the upward flowing column of the liquid medium and is removed by a screw auger. The liquid medium and plastic material are delivered to a rotary dryer (RD) which removes the liquid and allows the plastic to be deposited into a suitable container. The liquid medium from the RD is recirculated to the TMSC.

Accordingly, an object of this invention is to provide an improved apparatus and process for separating and reclaiming the components CECT. It is a further object of this invention to provide a system and apparatus for separating and reclaiming the components of materials having plastic bonded to metal.

DESCRIPTION OF THE PREFERRED EMBODIMENT

The process and apparatus of the present invention are now described with reference to the figures in which like numbers represent like elements throughout.

Figure 1:
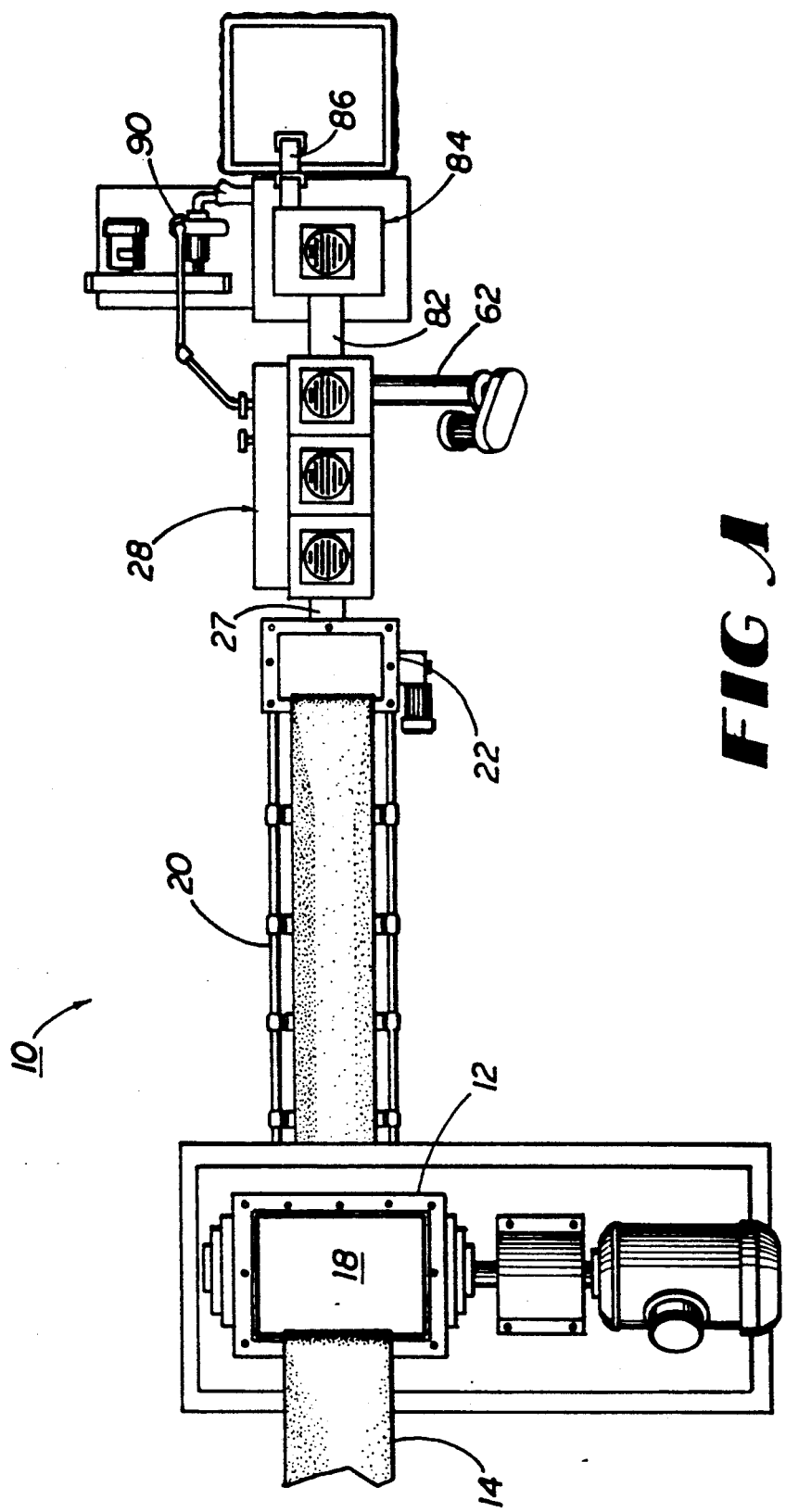
FIG. 1 shows an overall schematic view of the CECT classifying system according to a preferred embodiment of the present system.
Figure 2:
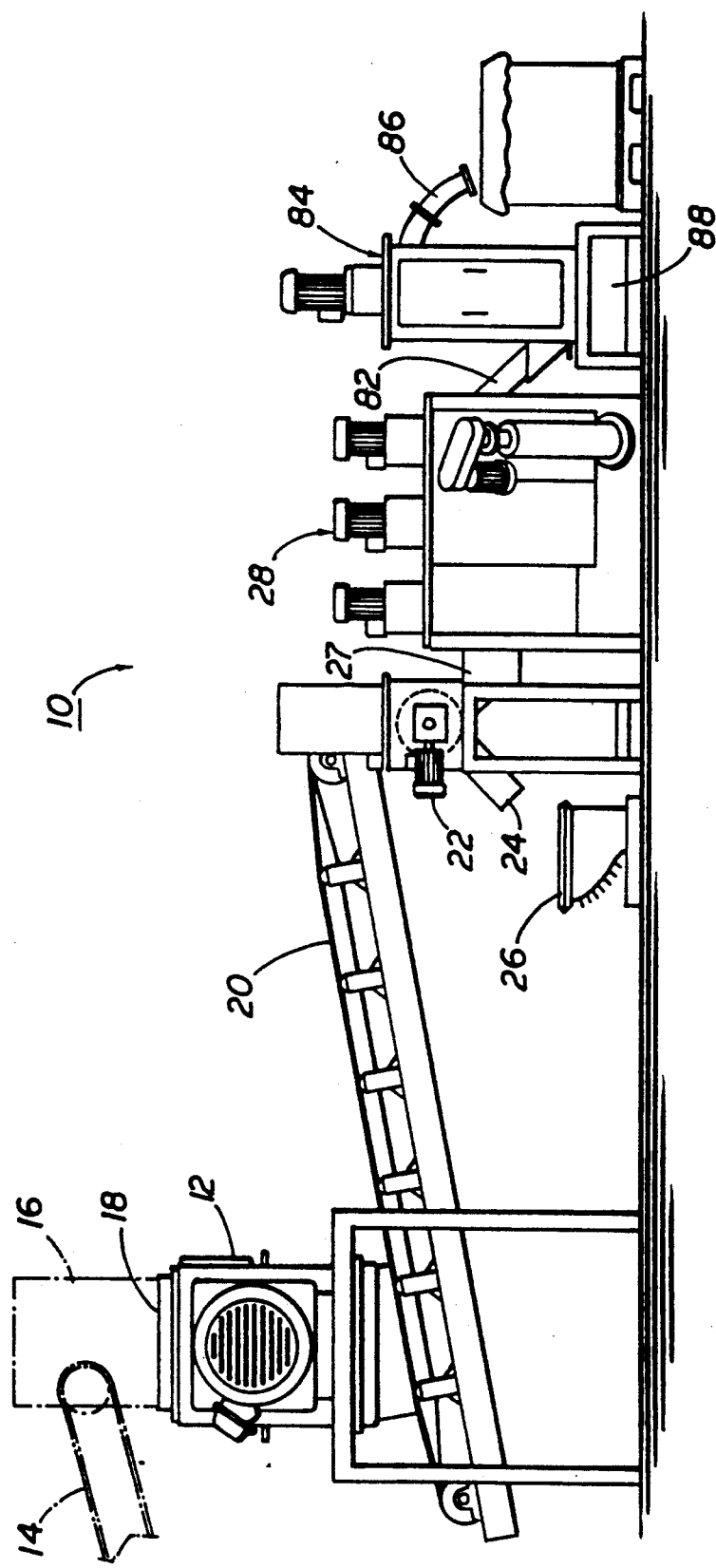
FIG. 2 shows a schematic front elevation view of the embodiment shown in FIG. 1.

FIGS. 1 and 2 show an overall system 10 for the separation of the materials in CECT according to the present invention. The system includes a size reduction machine (SRM) 12 which receives large pieces of CECT and produces CECT chips. CECT is transported to the SRM 12 by a conventional belt conveyor 14, although any suitable means for transporting solid materials can be used. The SRM 12 is a rotary knife grinder, a shear or other suitable size reducing means.

Reducing the size of the pieces of CECT is required to convert the inconsistent sizes and shapes of the discarded trim to the small consistent chip size required for this system. Consistent chip size helps to prevent the mass of a chip from interfering with the density based classification (separation) of the constituent fractions. The preferred chip size is two square inches in the largest cross-sectional dimension, but chips ranging in size from about one and one quarter to about two and one half inches can be processed through this system. The SRM 12 is equipped with a discharge screen with openings for the required size range. A receiving hood 16 is mounted above the SRM 12 to receive the material from the belt conveyor 14. The receiving hood 16 has an enclosed top and sides to allow relatively unobstructed entry into the SRM 12 and to prevent the ground material from being expelled back out of the feed opening 18.

Positioned directly beneath the SRM 12 is the primary conveyor 20, which receives the chips and transports them to the MDS 22. In the preferred embodiment for separation of CECT this conveyor is a conventional belt conveyor. Alternatively, other means for transporting solid materials can be used.

The material which enters the MDS 22 consists of two types of material: non-magnetic chips and magnetic chips. The magnetic chips comprise both mixed chips of plastic bonded to metal and chips of metal alone. The MDS 22 is a conventional magnetic drum separator that removes all non-magnetic chips from the process. This non-magnetic material is transported through chute 24 into a suitable container 26.

The magnetic chips obtained by the step of magnetically separating the materials are delivered to the TMSC 28 through the feed chute 27. The chips are submerged in a heated liquid medium in the TMSC 28. The heated liquid medium has a temperature of about 160° C.±5° C., and can be any standard heat transfer liquid medium with a flash point, if any, of up to 600° F. Any medium having a relatively high molecular weight and correspondingly low vapor pressure such that the medium has a high boiling temperature and a high flash point can be used in the present process. For example, the present process can use THERMANOL 55, a product of Texaco, which is a blend of aromatic hydrocarbons, heat stabilizers and flash point enhancers. The liquid medium is heated to the preferred operating temperature before the chips are added so that the heating of the chips can begin immediately upon their immersion in the liquid medium.

If the plastic component of the material being separated is heat stable and does not degrade at temperatures above 165° C., higher temperature liquid medium can be used. Temperatures below 155° C. can be used, but will be less effective in the thermal aspect of thermal-mechanical separation. The heated liquid medium then overflows out of the medium heating chamber 30, into the first agitation chamber through opening 92.

Figure 3:
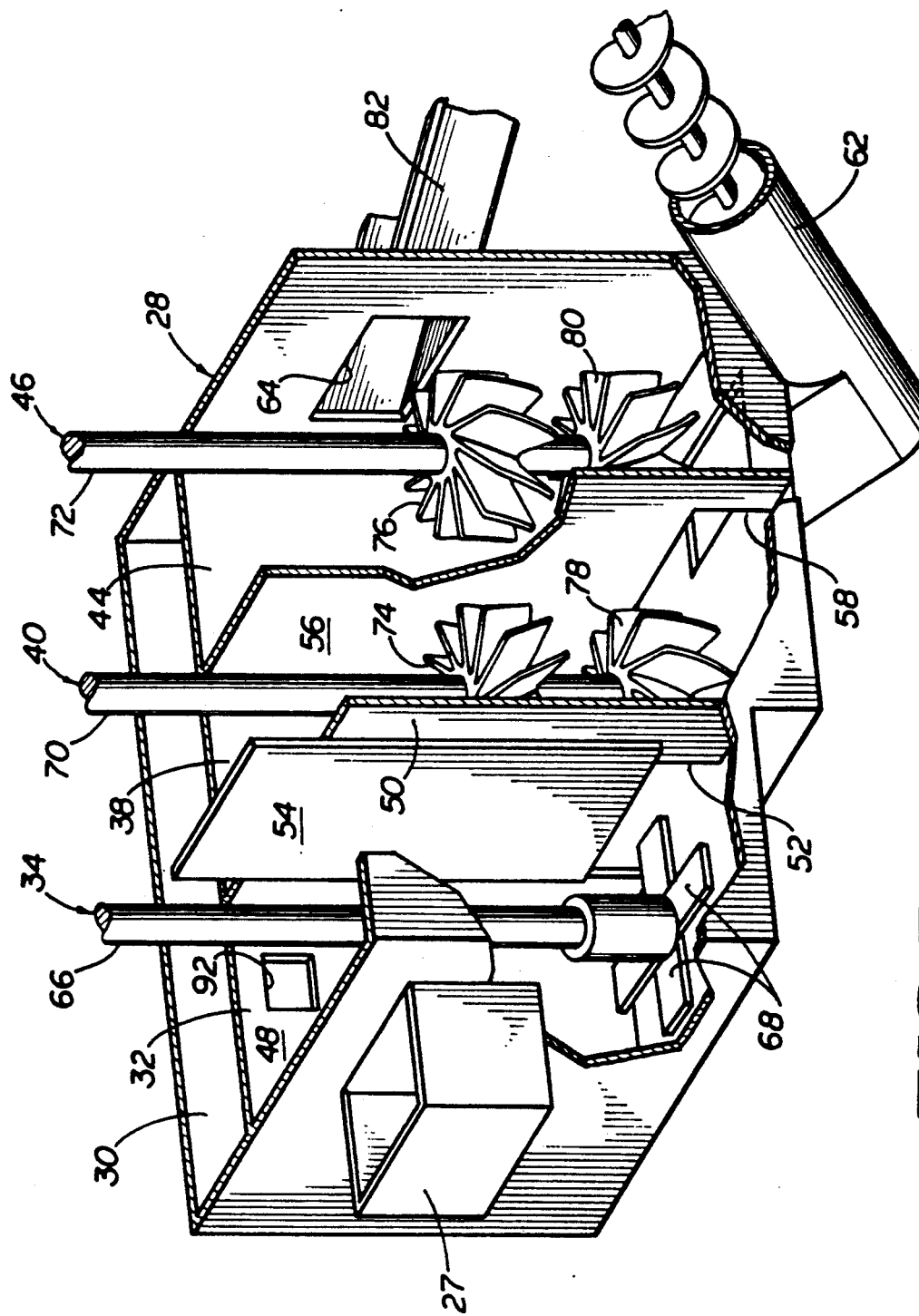
FIG. 3 is a partially broken away schematic view showing the thermal-mechanical separating classifier TMSC in a preferred embodiment.

The TMSC 28 is best seen in FIG. 3 and includes four chambers: one medium heating chamber 30 and three agitation chambers. The first agitation chamber 32 receives the heated liquid medium and the material to be separated. Means are provided for delivering the heated liquid medium to first agitation chamber 32. A first agitator 34 in the first agitation chamber 32 submerges the material, creating a flow of liquid medium and material and beginning the thermal-mechanical separation process by heating the chips. Flow means 36 interconnects the first agitation chamber 32 and the second agitation chamber 38 to allow the heated liquid medium and the material to flow from the first agitation chamber 32 into the second agitation chamber 38. A second agitator 40 in the second agitation chamber 34 agitates the material and creates a flow of liquid medium and material. Additional flow means 42 interconnects the second agitation chamber 38 and the third agitation chamber 44 to allow the heated liquid medium and the material to flow from the second agitation chamber 38 into the third agitation chamber 44. A third agitator 46 in the third agitation chamber 44, further agitates the material and creates an upward flow of liquid medium and material.

FIG. 3 shows the medium heating chamber 30 provided to receive and heat a liquid medium. Preferably, the medium heating chamber 30 is disposed such that it is adjacent to and shares one wall with one wall from each of the three agitation chambers. This configuration results in heat transfer from the medium heating chamber to the agitation chambers to better maintain the temperature of the liquid medium in the agitation chambers. Another acceptable configuration provides that the medium heating chamber 30 shares a wall 48 with at least the first agitation chamber 32. Both embodiments permit the heated liquid medium to flow directly from medium heating chamber 30, through opening 92 in shared wall 48, into the first agitation chamber 32.

Alternatively, the medium heating chamber 30 can be located remotely from the agitation chambers and connected to them by other liquid medium conveying means. Recycling means are provided for returning to the medium heating chamber the heated liquid medium that overflows from the third agitation chamber 44 with the plastic. The present invention also includes means for maintaining the temperature of the heated liquid medium within the appropriate temperature range. Such means include a thermostat and heating means such as a gas heat exchanger, an electric heating element, heating bands, etc.

In the preferred configuration of the TMSC 28, shown in FIG. 3, the first, second and third agitation chambers 32, 38, 44 are adjacent to each other and adjacent to the medium heating chamber 30. Each of the first, second, and third agitation chambers 32, 38, 40 shares one wall with the adjacent agitation chamber and shares one wall with the medium heating chamber 30. The shared walls between the agitation chambers provide for heat transfer between the agitation chambers, thus helping to maintain the temperature of the liquid medium in the chambers. The shared wall 50 between the first and second agitation chambers defines an opening 52 between the first and second agitation chambers. The opening 52 is preferably disposed near the bottom of the shared wall 50. The shared wall 56 between the second and third agitation chambers also has an opening 58 therein, disposed near the bottom of the wall. Alternatively, the openings between the chambers can be near the tops of their respective shared walls, in which case the medium and chips overflow from one chamber to the next.

Means such as gate 54 are provided for controlling the amount of heated liquid medium and material that flows through opening 52 between the first and second agitation chambers. Means 60 are provided for controlling the amount of heated liquid medium and material that flows through the opening 58 between the second and third agitation chambers. Such means could be the fixed size of the respective openings or could be gate-like mechanisms such as gate 54.

The linear arrangement of agitation chambers in the preferred TMSC 28 provides flow communication between the agitation chambers and, thereby, permits continuous processing of CECT through the TMSC 28. Thus, as unprocessed chips from the MDS 22 are conveyed to the first agitation chamber 32, a significant amount of the chips already in the first agitation chamber 32 are transported to the second agitation chamber 38 according to the principal of mass transfer, assisted by the current generated by the agitators. In the same manner, a similar amount of the chips already in the second agitation chamber 38 are transported to the third agitation chamber 44. Those chips in the third agitation chamber 44 are removed by the removal means, opening 64 and auger 62, at a rate selected to substantially match the rate at which unprocessed chips are conveyed to the first agitation chamber 32. The throughput rate will be based on the desired cleanliness quality of the separated products and will be empirically determined based on the results obtained at various throughput rates.

It is also seen in FIG. 3 that each agitation chamber can be offset downwardly from the agitation chamber preceding it to permit gravity to assist the transportation of liquid medium and chips from one chamber to the next.

The first, second and third agitators 34, 40, 46 of the TMSC 28 each comprise a downwardly depending shaft and blades disposed on the shaft, wherein spinning the shaft creates a turbulence and direction of flow determined by the pitch of the blades. More specifically, the downwardly depending shaft 66 of the first agitator 34 comprises four blades 68 that extend radially from the shaft 66. This agitator 34 generates a current of the heated liquid medium to submerge the chips to begin the process of thermal-mechanical separation and to transport the chips to the second agitation chamber 38.

The downwardly depending shafts 70, 72 of the second and third agitators 40, 46 each comprise an upper set of pitched blades 74, 76 and a lower set of oppositely pitched blades 78, 80, respectively. The upper set of blades 74 of the second agitator 40 is pitched oppositely to the upper set of blades 76 of the third agitator 46, and the lower set of blades 78 of the second agitator 40 is pitched oppositely to the lower set of blades 80 of the third agitator 46. The actions of the agitators scrub the chips against each other and against the agitators in their respective chambers by means of a scrubbing current of the heated liquid medium. The heat and scrubbing releases the plastic from the metal of the mixed chips. The third agitator 46 also creates an upward flow of liquid medium that separates the metal from the plastic by allowing the more dense metal to sink through the current onto auger 64 and by carrying the less dense plastic upward in an overflowing column of liquid medium and out of the TMSC 28 through opening 64.

The speed or horsepower of the spinning agitators will be determined by the throughput rate. At the desired fixed speed of agitation the required horsepower of the agitation will be determined by the amount of chips in the chamber. The more chips present in the chamber the higher the horsepower of the agitator motor must be to spin the agitator at the selected speed.

Means for removing the products of thermal-mechanical separation from the TMSC 28 are provided as shown in FIG. 3. The means are in fluid communication with the third agitation chamber and can be a discharge auger 62 spaced below and in fluid communication with the third agitation chamber 44 or a bottom conveyor for removing the more dense material that has been received thereon. Means provided near the top of a wall of the third agitation chamber 44 remove the less dense material. The preferred means for removing the less dense material is an opening 64 in a wall of the third agitation chamber 44 through which the less dense material may flow out of the chamber with the upward flowing column of liquid medium created by the agitators.

The velocity of upward movement of the upward flowing column of liquid medium in the third (final) agitation chamber is such that it entrains only the less dense of the products of separation, in this case the plastic component. Thus, although the plastic and metal will both usually be more dense than the liquid medium, they may be separated from each other based on their density differences relative to each other.

In the operation of the present process, heated liquid medium is supplied to the first agitation chamber 32 by pipe, conduit or direct fluid communication with medium heating chamber 30. The chips enter the TMSC 28 through feed chute 27 into the first agitation chamber 32. They then become submerged in the liquid medium and involved with the current created by the first agitator 34. The material is transported from first agitation chamber 32 past an adjustable gate 54 through opening 52, formed in shared wall 50, and into the second agitation chamber 38. Once in the second agitation chamber 38, the material again becomes involved with the current generated by the second agitator 40. The opposite pitch of the upper blades 74 and the lower blades 78 on this agitator create a severe scrubbing action against the chips. The chips are then carried out of this chamber through opening 58 into the third agitation chamber 44, which also has an opposite pitch agitator 46. After agitation in the third agitation chamber 44, the chips have been heated and agitated enough to release the plastic from the metal to a degree that satisfies the product quality parameters.

The metal chips leave the third agitation chamber 44 through the discharge auger 62. Discharge auger 62 extends transversely to the TMSC 28 and is angled upward from its lower end under the third agitation chamber 44. The discharge auger 62 carries the metal chips out of the liquid medium and is long enough to allow any liquid medium to drain off the chips before the chips are deposited in a suitable container.

The plastic chips are carried upward in the rising upflow column of liquid medium, which overflows out of the third agitation chamber 44 through opening 64 into overflow chute 82. The RD 84 dries the plastic by removing the heated liquid medium from it and deposits the plastic through product chute 86 into a suitable container. The liquid medium is drained from the RD 84, collected into a reservoir 88 and recycled by a pump 90 to the liquid medium heating chamber 30.

The present continuous separation process can be accomplished with two agitation chambers rather than the three agitation chambers of the preferred embodiment. If only two chambers are used, they will resemble the second and third agitation chambers of the preferred embodiment, having similar agitators. In the two chamber embodiment the chips from the MDS 22 are fed directly into the first agitation chamber where they become entrained in the agitating, scrubbing current created by the opposed pitch blades of the agitator. The functions of metering and pre-heating the chips as well as much of the separation function must be accomplished in a single first agitation chamber rather than in the first and second agitation chambers 32, 38 of the preferred embodiment. Therefore, it will be necessary for the chips to be retained and agitated in the first and second agitation chambers longer than would be required for the corresponding second and third agitation chambers 38, 44 of the preferred embodiment.

Although efficient separation can be accomplished in the two chamber TMSC embodiment, the retention time in the TMSC is longer resulting in a slower throughput rate. Thus, the overall time required to continuously process a given amount of chips will be longer in the two chamber embodiment than in a TMSC having three or more chambers.

The thermal-mechanical separation process of the present invention can also be accomplished in a TMSC having more than three agitation chambers. The effect of adding agitation chambers is to reduce the retention time for the chips in each chamber, thus, permitting a higher throughput rate for the material to be separated while maintaining the quality of the separated product. As in the two and three agitation chamber embodiments the openings between the chambers may include gating means to permit adjustment or they may be fixed to accommodate a set throughput rate. In the embodiment having more than three agitation chambers, the final agitation chamber will have removal means such as those described above for the preferred TMSC 28.

The operation of the CECT reclaiming system described above is now summarized. Pieces of CECT enter a size reduction device (SRD) and are reduced to a desired size chip. These CECT chips are then conveyed to the magnetic drum separator (MDS) which removes all non-metallic chips. The metallic chips and mixed chips enter the thermal-mechanical separating classifier TMSC. The scrubbing action and heat cause the plastic to separate from the metal. The plastic is carried out of the TMSC by a rising current column into a rotary dryer RD. The metal is removed from the TMSC by a discharge auger.

In an alternative embodiment of the present system, the thermal-mechanical separation can all take place in one agitation chamber, but this necessitates batch processing of CECT rather than the continuous processing as permitted by multiple interflowing agitation chambers described above. In the single chamber embodiment the material to be thermally and mechanically separated is conveyed to an agitation chamber where it is agitated for a sufficient time to separate the plastic and metal of the mixed chips. The separated constituents are then removed from the agitation chamber as a batch before the next batch of unprocessed chips is conveyed to the agitation chamber for separation.

In a further alternative configuration of the present system, the agitation chambers of the TMSC can be separated from each other by a space. This arrangement would require means, such as a pipe, conduit or conveyor, to transport the partially processed chips from one chamber to the next. The benefits of continuous processing are lost as a result of such an arrangement, because each agitation chamber would, essentially, become a separate batch processing station, as described above.

While the invention has been described in detail with particular reference to the preferred embodiment thereof, it will be understood that variations and modifications can be effected within the spirit and scope of the invention as previously described and as defined by the claims.

What is claimed is:

1. An apparatus for the thermal-mechanical separation of bonded material comprising:
   (a) a first agitation chamber for receiving a heated liquid medium and the material to be separated;
   (b) means for providing the heated liquid medium to said first agitation chamber;
   (c) a first agitator in said first agitation chamber for submerging the material in the liquid medium and creating a flow of the liquid medium and material;
   (d) a second agitation chamber;
   (e) flow means, interconnecting said first and second agitation chambers, for permitting the heated liquid medium and the material to flow from said first agitation chamber into said second agitation chamber;
   (f) a second agitator in said second agitation chamber for agitating the material and creating a flow of liquid medium and material, wherein the agitation of the material in the heated liquid medium causes separation of the bonded material;
   (g) a third agitation chamber;
   (h) flow means, interconnecting said second and third agitation chambers, for permitting the heated liquid medium and the material to flow from said second agitation chamber into said third agitation chamber;
   (i) a third agitator in the third agitation chamber for agitating the material and creating a flow of liquid medium and material, wherein the agitation of the material in the heated liquid medium causes separation of the bonded material;
   (j) means in fluid communication with the third agitation chamber for removing the separated material.

2. The apparatus of claim 1, further comprising means for maintaining the temperature of the heated liquid medium within a temperature range of from about 155 degrees Celsius to about 165 degrees Celsius.

3. The apparatus of claim 1, further comprising a medium heating chamber for receiving and heating a liquid medium.

4. The apparatus of claim 3, wherein said medium heating chamber is disposed such that it is adjacent to and shares one wall with one wall from the first agitation chamber.

5. The apparatus of claim 3, wherein said first, second, and third agitation chambers are adjacent to each other and adjacent to said medium heating chamber and each of said first, second, and third agitation chambers shares one wall with the adjacent agitation chamber and shares one wall with said medium heating chamber.

6. The apparatus of claim 5, wherein said shared wall between said first and second agitation chambers defines an opening between said first and second agitation chambers.

7. The apparatus of claim 6, wherein said opening between the first and second agitation chambers is disposed near the bottom of the shared wall between said first and second agitation chambers.

8. The apparatus of claim 6, further comprising means for controlling the amount of heated liquid medium and material that flows through said opening between said first and second agitation chambers.

9. The apparatus of claim 5, wherein said shared wall between said second and third agitation chambers defines an opening between said second and third agitation chambers.

10. The apparatus of claim 9, wherein said opening between said second and third agitation chambers is disposed near the bottom of the shared wall between said second and third agitation chambers.

11. The apparatus of claim 9, further comprising means for controlling the amount of heated liquid medium and material that flows through said opening between said second and third agitation chambers.

12. The apparatus of claim 1, wherein said means for removing the products of separation comprises:
   (a) first removal means spaced below and in fluid communication with said third agitation chamber for removing the more dense material that has been received thereon; and
   (b) second removal means disposed near the top of a wall of said third agitation chamber to remove less dense material.

13. The apparatus of claim 12, wherein said first removal means comprises an auger.

14. The apparatus of claim 12, wherein said second removal means comprises a wall in the third agitation chamber having an opening through which the lighter material may flow out of the third agitation chamber with the liquid medium.

15. The apparatus of claim 3, further comprising recycling means for returning the heated liquid medium from the third agitation chamber to the medium heating chamber.

16. The apparatus of claim 1, wherein said first, second and third agitators each comprise:
   (a) a downwardly depending shaft; and
   (b) blades disposed on said shaft, wherein spinning said shaft creates a turbulence in the liquid medium and direction of flow of the liquid medium determined by the pitch of said blades.

17. The apparatus of claim 16, wherein said downwardly depending shaft of said second and third agitators each comprise an upper set of pitched blades and a lower set of oppositely pitched blades, the opposite pitch of the upper set and lower set of blades causing agitation of the material in the liquid medium.

18. The apparatus of claim 17, wherein the upper set of blades of the second agitator is pitched oppositely to the upper set of blades of the third agitator, and the lower set of blades of the second agitator is pitched oppositely to the lower set of blades of the third agitator.

19. A process for the separation of material having plastic bonded to metal comprising the steps of:
(a) reducing the size of the material to chips ranging in size from about 1 inch to about 2.5 inches in their largest cross-sectional dimension;
(b) magnetically separating the material into a magnetic fraction and a non-magnetic fraction, wherein the magnetic fraction comprises both mixed chips of plastic bonded to metal and chips of metal;
(c) removing the non-magnetic fraction from the process;
(d) delivering the magnetic fraction to a heated liquid medium in a first agitation chamber;
(e) generating an agitating current of said heated liquid medium in said first agitation chamber to submerge the chips and transport the chips to a second agitation chamber;
(f) scrubbing the chips against each other and against the second agitator in the second agitation chamber by means of a scrubbing current of the heated liquid medium generated by the second agitator, wherein the heat and scrubbing releases the plastic from the metal of the mixed chips;
(g) transporting the scrubbed chips to a third agitation chamber;
(h) further scrubbing the chips against each other and against the third agitator in the third agitation chamber by means of the scrubbing current of the heated liquid medium generated by the third agitator, wherein the heat and scrubbing releases any plastic that remains adhered to metal;
(i) removing the metal and the plastic as products of separation by allowing the metal to sink onto removal means and by carrying the plastic upward and out of the third agitation chamber in an overflowing column of liquid medium created by the third agitator.

20. The process of claim 19, wherein said magnetic separating step is accomplished by magnetic drum separation.

21. The process of claim 19, further comprising the steps of heating and maintaining the temperature of the heated liquid medium within a temperature range of from about 155 degrees Celsius to about 165 degrees Celsius.

22. The process of claim 21, further comprising the step of recycling the liquid medium that overflows from the third agitation chamber with the plastic to be used in said delivering step of the thermal-mechanical separating process.

23. The process of claim 22, further comprising the step of drying the plastic after removal from the third agitation chamber by rotary drying, wherein the liquid medium is drained from the plastic.

24. A process for the thermal-mechanical separation of plastic from metal in mixed chips of co-extruded car trim that contain both metal and plastic, including chips with plastic adhered to the metal, comprising the steps of:
(a) heating a liquid medium in a medium heating chamber;
(b) conveying the heated liquid medium from the medium heating chamber to a first agitation chamber;
(c) conveying chips to the first agitation chamber;
(d) generating an agitating current of said heated liquid medium in said first agitation chamber to submerge the chips and transport the chips to a second agitation chamber;
(e) first scrubbing the chips against each other and against a second agitator in the second agitation chamber by means of a scrubbing current of the heated liquid medium generated by the second agitator, wherein the heat and scrubbing releases the plastic from the metal of the mixed chips;
(f) transporting the scrubbed chips along with the flow of liquid medium to a third agitation chamber;
(g) second scrubbing the chips against each other and against a third agitator in the third agitation chamber by means of the scrubbing current of the heated liquid medium generated by the third agitator, wherein the heat and scrubbing releases any plastic remaining adherent to metal;
(h) separating the metal from the plastic by allowing the metal to sink onto removal means and by carrying the plastic upward in an overflowing column of liquid medium created by the third agitator;
(i) removing the metal fraction; and
(j) removing the plastic fraction.

25. An apparatus for the thermal-mechanical separation of bonded material comprising:
(a) a first agitation chamber for receiving a heated liquid medium and the material to be separated;
(b) means for providing the heated liquid medium to said first agitation chamber;
(c) a first agitator in said first agitation chamber for agitating the material and creating a flow of liquid medium and material, wherein the agitation of the material in the heated liquid medium causes separation of the bonded material;
(d) a second agitation chamber;
(e) flow means, interconnecting said first and second agitation chambers, for permitting the heated liquid medium and the material to flow from said first agitation chamber into said second agitation chamber;
(f) a second agitator in the second agitation chamber for agitating the material and creating a flow of liquid medium and material, wherein the agitation of the material in the heated liquid medium causes separation of the bonded material;
(g) means in fluid communication with the second agitation chamber for removing the separated material.

* * * * *